United States Patent
Chen et al.

(10) Patent No.: US 9,623,877 B2
(45) Date of Patent: Apr. 18, 2017

(54) INTEGRATED GRADE AND PITCH ESTIMATION USING A THREE-AXIS INERTIAL-MEASURING DEVICE

(71) Applicant: GM Global Technology Operations LLC, Detroit, MI (US)

(72) Inventors: Shih-ken Chen, Troy, MI (US); Nikolai K. Moshchuk, Grosse Pointe, MI (US); Jin-Jae Chen, Canton, MI (US); David M. Sidlosky, Beverly Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/888,657

(22) PCT Filed: May 2, 2014

(86) PCT No.: PCT/US2014/036481
§ 371 (c)(1),
(2) Date: Nov. 2, 2015

(87) PCT Pub. No.: WO2014/179640
PCT Pub. Date: Nov. 6, 2014

(65) Prior Publication Data
US 2016/0068165 A1    Mar. 10, 2016

Related U.S. Application Data

(60) Provisional application No. 61/818,551, filed on May 2, 2013.

(51) Int. Cl.
*G01M 17/00*  (2006.01)
*B60W 40/11*  (2012.01)
(Continued)

(52) U.S. Cl.
CPC .......... *B60W 40/11* (2013.01); *B60W 40/076* (2013.01); *B60W 2050/0031* (2013.01);
(Continued)

(58) Field of Classification Search
None
See application file for complete search history.

(56) References Cited

U.S. PATENT DOCUMENTS

| 6,714,851 B2 | 3/2004 | Hrovat et al. |
| 2006/0030991 A1 | 2/2006 | Barta et al. |

(Continued)

OTHER PUBLICATIONS

International Search Report dated Sep. 4, 2014 for PCT/US2014/036481.

*Primary Examiner* — Adam Alharbi
(74) *Attorney, Agent, or Firm* — Mickki D. Murray, Esq.; Parks IP Law LLC

(57) ABSTRACT

A system for use at a vehicle to estimate vehicle pitch angle and road grade angle, in real time and generally simultaneously. The system includes a sensor configured to measure vehicle pitch rate, a processor, and a computer-readable medium. The medium includes computer-executable instructions that, when executed by the processor, cause the processor to perform operations comprising estimating, using an observer and the vehicle pitch rate measured by the sensor, an estimated vehicle pitch rate. The operations further comprise estimating, using an observer and the measured vehicle pitch rate, the vehicle pitch angle, and estimating, based on the estimated vehicle pitch rate and the vehicle pitch angle estimated, the road grade angle.

20 Claims, 7 Drawing Sheets

(51) Int. Cl.
*B60W 40/076* (2012.01)
*B60W 50/00* (2006.01)

(52) U.S. Cl.
CPC ............... *B60W 2050/0035* (2013.01); *B60W 2420/905* (2013.01); *B60W 2520/16* (2013.01)

(56) References Cited

U.S. PATENT DOCUMENTS

| | | |
|---|---|---|
| 2007/0239320 A1 | 10/2007 | Ryu et al. |
| 2008/0059021 A1* | 3/2008 | Lu ..................... B60G 17/0195 701/36 |
| 2008/0082246 A1* | 4/2008 | Brown ............... B60T 8/17552 701/91 |
| 2008/0086248 A1* | 4/2008 | Lu ........................ G05D 1/0891 701/41 |
| 2008/0086251 A1* | 4/2008 | Lu ......................... B60T 8/1755 701/70 |
| 2008/0243335 A1 | 10/2008 | Rao et al. |
| 2012/0209490 A1 | 8/2012 | Lu et al. |
| 2014/0278040 A1* | 9/2014 | Singh ................... G01M 17/06 701/124 |

\* cited by examiner

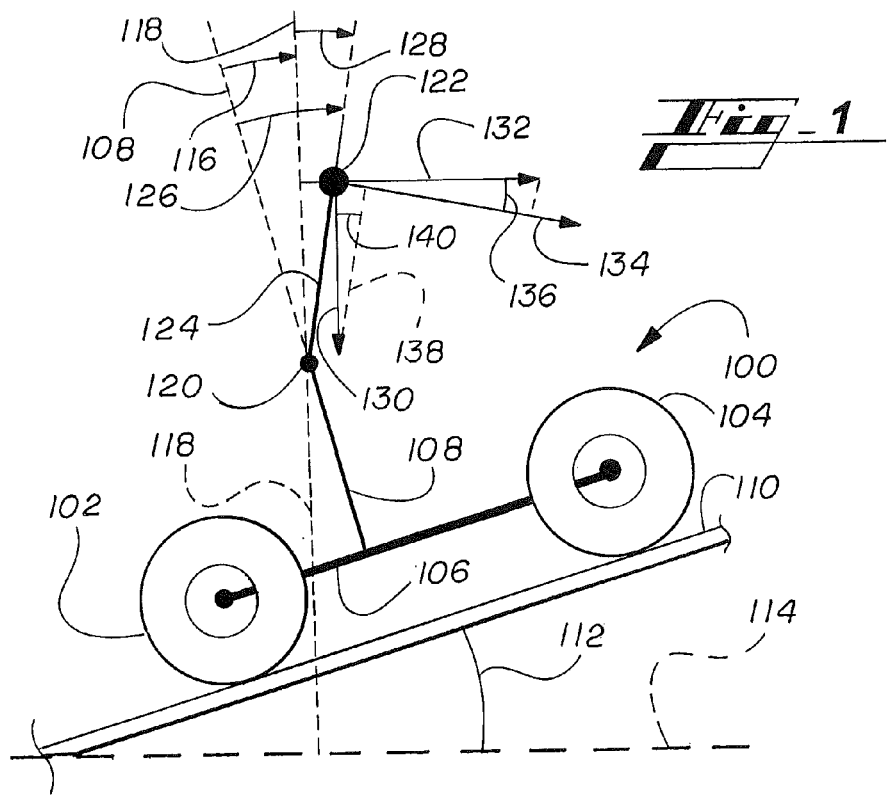
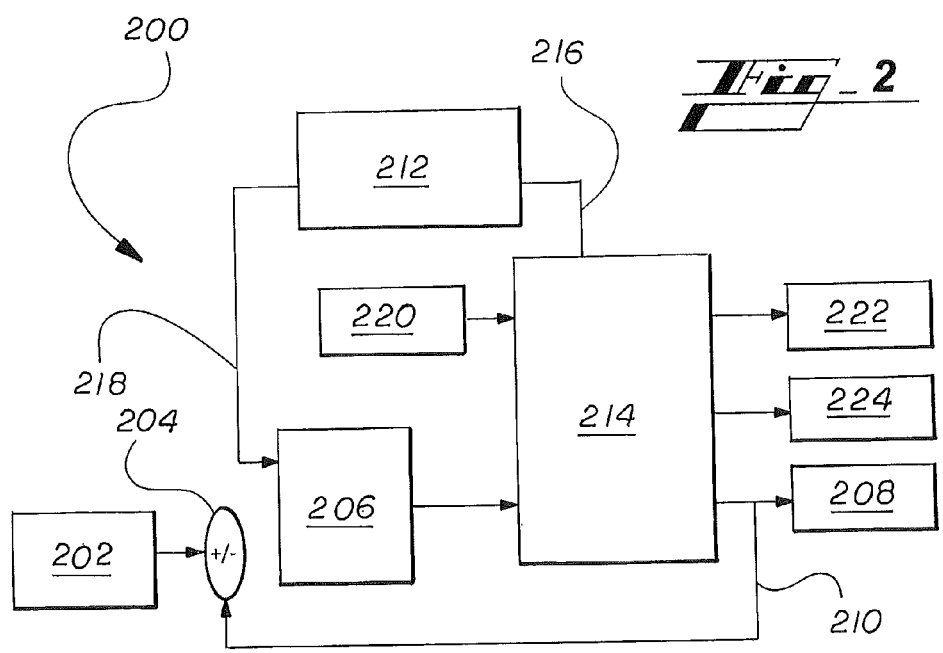

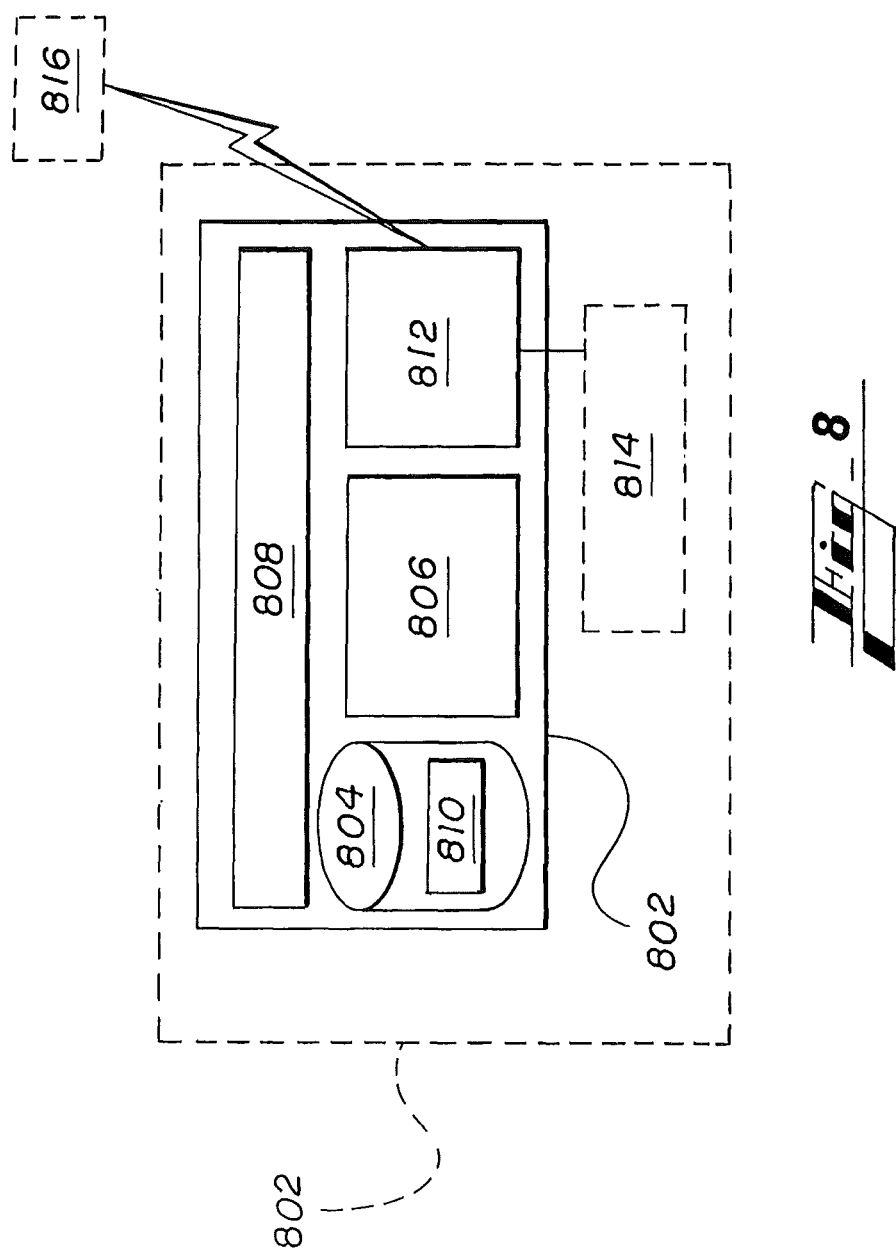

INTEGRATED GRADE AND PITCH ESTIMATION USING A THREE-AXIS INERTIAL-MEASURING DEVICE

TECHNICAL FIELD

The present disclosure relates generally to systems and methods for estimating road grade and vehicle pitch angles and, more particularly, to systems and methods for estimating the angles using a three-axis inertial-measuring device.

BACKGROUND

Modern vehicles are being equipped increasingly with autonomous driving (AD) systems. Operation of these systems is improved with accuracy of vehicle and environmental data available.

Advanced AD systems use data including road grade angle and vehicle pitch angle, especially in acceleration, deceleration, and/or sloped-road situations.

Road grade angle and vehicle pitch angle can be measured, directly. The angles can be measured, for instance, using one or more dedicated optical sensors, and/or a multi-antenna satellite arrangement—e.g., Global Positioning System (GPS). A high-accuracy GPS unit can be placed at each of four corners of a vehicle to measure pitch (also, roll and/or yaw) angles of the vehicle. These methods are very expensive, though, and not feasible within typical consumer price points.

Moreover, measurement data may have inaccuracies due to even slight measurement-device offset or error, noise, and/or failure of the system to still contextualize the measured data—e.g., even if pitch-direction movement is accurately detected using GPS units, the system would require accurate road-grade angle data in order to properly determine what proportion of the measured pitch-direction movement is due to vehicle pitch as opposed to road grade.

The present technology solves these and other shortcomings by estimating accurately both vehicle pitch angle and road grade angle, together, using a correcting observer software module applying a tuned observer gain.

SUMMARY

The present disclosure relates, in some embodiments, to a system, for use at a vehicle to estimate vehicle pitch angle and road grade angle, in real time and generally simultaneously, comprising a sensor configured to measure vehicle pitch rate, a processor, and a computer-readable medium holding computer-executable instructions that, when executed by the processor, cause the processor to perform various operations.

The operations include estimating, using an observer and a measured vehicle pitch rate, a vehicle pitch rate. The operations also include estimating, using an observer and a measured vehicle pitch rate, vehicle pitch angle. And the operations include estimating, based on the vehicle pitch rate estimated and the vehicle pitch angle estimated, a road grade, or slope, angle.

In another aspect, the technology includes a method including operations like the operations recited above in connection with the system.

In another aspect, the technology includes a computer-readable storage device, like the computer-readable medium of the system recited above.

Other aspects of the present technology will be in part apparent and in part pointed out hereinafter.

BRIEF DESCRIPTION OF THE DRAWINGS

FIG. 1 illustrates schematically a vehicle on a grade, or sloped, road, and select variables including road and vehicle angles, according to an embodiment of the present disclosure.

FIG. 2 illustrates an exemplary flow chart of operations of the present technology including a gain adaptation function, according to an embodiment of the present disclosure.

FIG. 8 illustrates an exemplary computing system for use in performing functions of the present technology.

Figure 3:
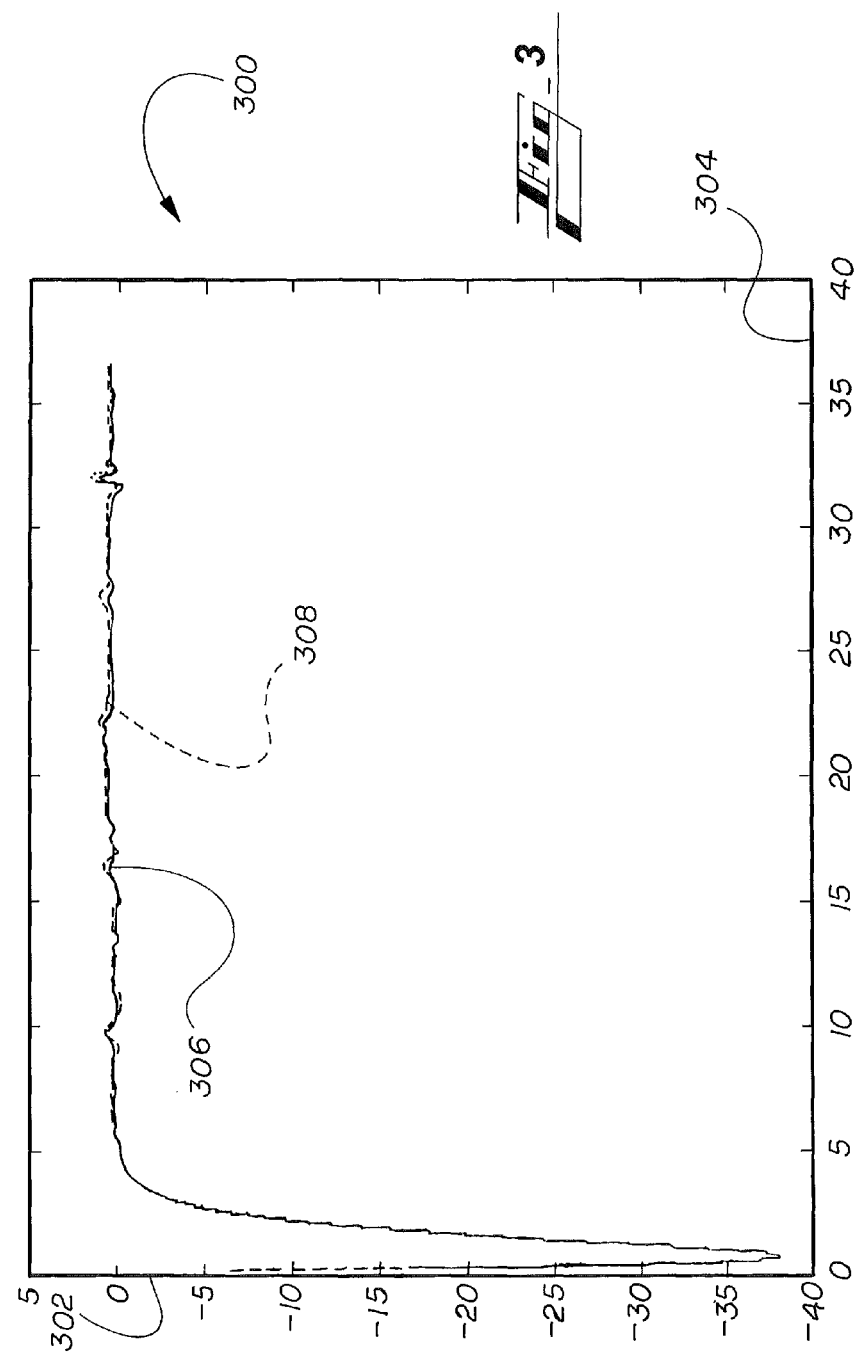
FIG. 3 is a graph showing first example grade and pitch estimation data in connection with vehicle operation on a first road.

It will be appreciated that for simplicity and clarity of illustration, elements shown in the figures have not necessarily been drawn to scale. Dimensions of some of the elements may, for example, be exaggerated relative to other elements for clarity. Further, where considered appropriate, reference numerals may be repeated among the figures to indicate corresponding or analogous elements.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

Descriptions are to be considered broadly, within the spirit of the description. For example, references to connections between any two parts herein are intended to encompass the two parts being connected directly or indirectly to each other. As another example, a single component described herein, such as in connection with one or more functions, is to be interpreted to cover embodiments in which more than one component is used instead to perform the function(s). And vice versa—i.e., multiple components described herein in connection with one or more functions is to be interpreted to cover embodiments in which a single component performs the function(s).

The figures are not necessarily to scale and some features may be exaggerated or minimized, such as to show details of particular components.

In some instances, well-known components, systems, materials or methods have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. Overview of the Disclosure

In various embodiments, the present disclosure describes at least one algorithm configured to estimate road grade angle and vehicle pitch angle. The road grade, or slope, angle is an angle by which the road on which the vehicle is traveling slopes up or down in the traveling, or longitudinal, direction of the vehicle.

The grade angle is formed between a road on which the vehicle is positioned and true or environmental-frame horizontal, which can also be referred to as the earth plane or sea plane, as shown by way of example in the first appended figure, as described further below. Grade forms can include or decline in the primary direction of vehicle travel.

The vehicle pitch angle is an angle between a sprung portion of the vehicle and the balance of the vehicle about a lateral, or y, axis of the vehicle. According to a common convention, a positive pitch angle would result from the front of the vehicle raising (e.g., in response to a fast acceleration), and a negative pitch angle would result from the front of the vehicle lowering (e.g., in response to aggressive braking). The sprung portion of the vehicle is generally that portion connected above the suspension and the tires.

In one embodiment, the angles are estimated using output from a three-axis inertial-measuring device. The angles can then be used in various vehicle functions. In a primary scenario, the angles estimated are used in support of autonomous-driving functions.

In some embodiments, the technology is configured to estimate the road grade angle and vehicle pitch angle simultaneously, or generally simultaneously.

The algorithm(s) is in some implementations embodied at least partially by computer code configured to cause a processor to perform some or all of the operations described herein.

As provided, operation of autonomous-driving systems is improved when more-accurate data about the vehicle and environment is available. The accurate data is especially useful in situations in which the vehicle is maneuvering, such as accelerating, turning, braking, and/or when the road varies from flat, such as by having a grade and/or bank.

The present technology can be used to provide accurate road and vehicle position data including road grade angle and vehicle pitch angle. The technology can also be used, analogously, to estimate accurately road bank and vehicle roll angles.

Autonomous-driving-related functions improved by high-accuracy estimations of road angle and vehicle angle includes camera-sensing. The vehicle uses the angle information in interpreting vehicle camera data. The information is helpful especially when the vehicle is on a road that is pitched and/or banked and the system may otherwise not accurately contextualize the camera data.

Cameras are commonly mounted rigidly to the sprung portion of the vehicle, and so move in response to vehicle pitch. Without data indicating vehicle sprung movement (e.g., pitch), or with less-accurate sprung-movement data, the system will not be able to accurately interpret the camera data. The system may not be able to determine well, for instance, whether a sensed change in angle between the sprung portion and the road surface is due to a change in the road surface or sprung-portion movement (e.g., pitch).

The autonomous-driving-related functions improved by high-accuracy estimations of road angle and vehicle angle include control of brake and steering on angled roads—e.g., pitched, etc. The information can be helpful especially when the vehicle is on a road that is pitched and/or banked, so the autonomous actions are tailored best to the road conditions and vehicle position.

As provided road and vehicle angles, e.g., road grade and vehicle pitch angles, can be measured directly, such as by a dedicated optical sensor, or a dual-antenna GPS unit. And high cost of implementation is one shortcoming of these direct-measure approaches.

It is also challenging, and perhaps not even feasible, to measure road and vehicle angles, e.g., road grade and vehicle pitch angles, using a standard inertial-movement unit (IMU) sensor set.

The present technology uses at least one additional sensor, beyond the motion sensors found commonly in most present-day vehicles. For estimating road grade and vehicle pitch, the additional sensor(s) includes a pitch-rate sensor. The additional sensor can be, or be a part of, a three-dimensional inertia-measuring device, such as a 3-axis IMU.

Some vehicles may already include some type of pitch-rate sensor. Some, for instance, may include a pitch-rate sensor for use in determining a propensity of accident, such as in connection with airbag operation. Such a pitch-rate sensor, if present, would be limited, such as by having only an accuracy level sufficient for reliably identifying a potential accident scenario, or by only measuring pitch with more accuracy after triggered by a determination that a threshold vehicle pitch rate has been sensed.

The pitch-rate sensor used in the present technology is in various embodiments a different pitch-rate sensor or a different type of sensor. The pitch-rate sensor used can be, for example, more accurate than the pitch-rate sensors used commonly on vehicles.

The technology also includes an algorithm using a virtual observer to process sensor data in estimating road and vehicle angle.

As provided, the present algorithm(s) is in some implementations embodied at least partially by computer code configured to cause a processor to perform any or all of the operations described herein. The code is stored on a storage device, or memory. Example computing structure is described further, below in connection with FIG. 8. Components used in the performing the functions of the present technology are at times referred to generically herein by terms such as system, or sub-system.

In one embodiment, the algorithm includes three (3) primary operations, each of which can include one or more sub-routines. The operations include (1) estimating pitch rate and pitch angle, (2) estimating road grade, or slope (include or decline), and (3) tuning observer gain. The operations can be summarized as shown in FIG. 2, and are described further, below, in turn.

II. First Operation

Estimate Pitch Rate and Pitch Angle

As provided, embodiments of the present technology configured to estimate vehicle pitch angle and road grade angle use an accurate pitch-rate sensor. For the first operation, the system obtains data from the sensor for a present time.

As mentioned, while the present disclosure focuses on an overall goal of estimating accurately vehicle pitch angle and road-grade angle, the teachings of the present technology can be extended to include estimating accurately vehicle roll angle and road bank angle. Or the technology can include accurate estimation of all four of vehicle roll and pitch angles, and road bank and grade angles. For embodiments configured to estimate vehicle roll angle and road bank angle, an accurate roll-rate sensor is used in this first operation, and for embodiments in which all four angles are measured, accurate roll-rate and pitch-rate sensors are used in connection with the first operation.

The algorithm, embodied at least in part by computer-executable instructions, is configured to cause the system to use the measured pitch rate to determine a pitch estimate. The computing components of the present technology are mentioned above and described further below, including in connection with the schematic illustration of FIG. 8.

The algorithm also causes the system to use the measured pitch rate to estimate a pitch angle. Because of the effectiveness of this estimation, and assuming a high-accuracy pitch-rate sensor, the estimated pitch rate and the pitch-rate measurement are at times very similar or even fully, substantially, or generally identical. The relationship is described further below in connection with the exemplifying data charts of the latter figures, FIGS. 5-7.

For situations in which the pitch-rate sensor has more than nominal error, for reasons such as those described above, which may be temporary, the measured pitch rate and the estimated pitch rate may differ at least slightly. The present technology is configured so that, preferably, the estimated pitch rate will be more accurate generally in these situations no matter how transient.

In one embodiment, the pitch rate and pitch angle are estimated using a Luenberger-type of observer and single degree-of-freedom (1-DOF) dynamics model. The observer and model can be represented by the following relationships:

$$(J_{yy}+M_s h^2)\ddot{\theta}+C_{\theta\theta}\dot{\theta}+K_{\theta\theta}\theta=M_s h a_x \quad \text{(Equation 1)}$$

wherein:
- $J_{yy}$ is a pitch moment of inertia of the vehicle 100;
- $M_s$, indicated in the first figure, FIG. 1, by reference numeral 122, is the sprung mass, or the mass of the portion of the vehicle 100 above the suspension and the tires;
- h, indicated in FIG. 1 by reference numeral 124, is a height of the center of gravity of the sprung portion of the vehicle measured from the vehicle pitch center 120;
- $\ddot{\theta}$ (double derivative of lower-case Roman numeral theta, or, theta^dot-dot) represents a pitch acceleration, or the angular acceleration of the vehicle 100 in the pitch direction—about the y, lateral, axis of the vehicle;
- $C_{\theta\theta}$ (or, C_sub_two lower-case Roman numeral thetas) represents a vehicle damping coefficient or constant, which may be pre-determined by a designer of maker of the system, such as in pre-manufacturing testing or simulations, to compensate for damping effects within the system, such as damping effects of the tires;
- $\dot{\theta}$ (first derivative of lower-case Roman numeral theta) represents a pitch velocity, or the angular velocity of the vehicle 100 in the pitch direction—about the y, lateral, axis of the vehicle;
- $K_{\theta\theta}$ (or, K_sub_two lower-case thetas) represents a vehicle stiffness coefficient or constant, which also may be pre-determined by a designer of maker of the system, such as in pre-manufacturing testing or simulations, to compensate for a stiffness, or inverse of a vehicle spring characteristic;
- $\theta$ (lower-case Roman numeral theta) represents the pitch angle being estimated;
- $a_x$ represents linear longitudinal acceleration;

$$\dot{\theta}=q+L_1(q_{meas}-q) \quad \text{(Equation 2)}$$

q is the pitch rate being estimated;

$L_1$ represents a first observer gain, which can be determined as described, or determined and tuned, as described further below in connection with the third operation;

$q_{meas}$ represents measured pitch rate;

$$\dot{q}=\{-C_{\theta\theta}[q+L_2(q_{meas}-q)]-K_{\theta\theta}\theta+M_s h a_x\}J_{yy}^{-1} \quad \text{(Equation 3)}$$

$\dot{q}$ (or, first derivative of q, or, q^dot) represents the first derivative of the pitch rate being estimated, or pitch acceleration; and $L_2$ is a second observer gain, which, like the first gain, can be determined as described, or determined and tuned, as described further below in connection with the third operation—a separate, second, gain, different than the first observer gain, is in some embodiments used to accommodate a second state of the system.

III. Second Operation

Estimate Road Grade|FIG. 1

The second operation is described in connection with the figures, and more particularly the first figure. FIG. 1 illustrates schematically a vehicle on a sloped road, and select variables including road and vehicle angles, according to an embodiment of the present disclosure.

The vehicle is indicated schematically by reference numeral 100 in the figure. The vehicle 100 includes a front tire 102 and a rear tire 104.

The vehicle 100 also includes a longitudinal centerline, or x-direction, axis 106 extending between a front axle holding the front tire 102 and a rear axle holding the rear tire 104.

In various embodiments, the tires 102, 104 can represent tires on left of the vehicle, on the right, or both.

With continued reference to FIG. 1, a pitch-neutral, or no-pitch, vertical center line of the vehicle 100, extending vertically in a vehicle frame when the vehicle has no pitch, is indicated by reference 108. It should be appreciated that the no-pitch vertical center line 108 is generally perpendicular to the vehicle x-direction, longitudinal, axis 106. When conditions cause the vehicle 100 to pitch, as may be the case while the vehicle is being slowed or accelerated, affected by rapid road slope, or while the vehicle is driving on a graded road, such as the grade 110 of FIG. 1, the pitch-neutral vertical center line of the vehicle would stay the same, as shown in FIG. 1, remaining generally perpendicular to the longitudinal axis 106.

The vehicle 100 is traveling on a road 110 having a grade in the example of FIG. 1. The amount of grade of the road 110 can be quantified as an angle 112 between the road surface and horizontal 114, or environmental-frame vertical. The bank angle 112 can be referred to by lower-case Roman numeral alpha (α).

It will be appreciated that, with the road 110 to ground 114 angle 112 being small alpha (α), the vertical center line 108 will form generally the same angle (α) at location 116 with a straight ground vertical line 118 (being perpendicular to the ground 114) based on basic geometric principles. There may be some losses or variations in the components between the road 110 and the vehicle 100, such as by one of the tires deforming more than the other during the driving maneuver shown in FIG. 1, so that the second angle 116 would vary from the road-to-ground bank angle 112, the difference will generally be minimal with respect to the grade and vehicle pitch angles being evaluated.

Further, the algorithm of the present technology, including the observer mentioned above and described further below, can be configured to, in tunings of its observer gain, can adjust to accommodate such variables for even better estimates of pitch and grade angles.

FIG. 1 also calls out by reference numeral 120 a pitch center of the vehicle 100. The point 120 creates a reference through which the environmental vertical 118 can be located.

As mentioned above, FIG. 1 also shows a sprung-mass point ($M_s$), which is indicated in the figure by reference numeral 122. As also mentioned, the vehicle pitch angle ($\alpha$) is an angle between a sprung portion of the vehicle 100 and the balance of the vehicle, about the vehicle lateral, y, axis, and the sprung portion is generally that portion connected above the suspension and the tires. The sprung-mass point ($M_s$) 122 can be viewed as analogous to a center of gravity of the vehicle, except being specific to the sprung-mass portion of the vehicle 100 instead of the being for the overall vehicle.

As also shown in FIG. 1, the center of gravity 120 and the sprung-mass point 122 are separated by a height 124, or $h_p$, wherein h represents height and p represents pitch. As with all names provided by way of example herein, other naming conventions can be used without departing from the scope of the present disclosure. A length of the line 124 can be referred to as length $h_p$, or as length 124.

FIG. 1 further calls out, by reference numeral 126, an angle between the non-pitch vehicle-frame vertical 108, described above, and the CG-to-sprung-mass line 124 ($h_p$). The angle 126 represents the vehicle pitch, being estimated, which is also referenced herein by lower-case Roman numeral theta ($\theta$), such as above in the equation above.

From the figure, it will be appreciated that an angle 128 (or, $\delta$) separating the mass-sprung height line 124 ($h_p$) and environmental vertical 118 is a difference between the angle 126 (or, $\theta$) and the angle 116, which angle 116 is generally equivalent to the grade angle ($\alpha$) as described above. Or, $\delta = \theta - \alpha$. The relationship can be used to estimate indirectly the road grade angle ($\alpha$) 112, as described further below.

FIG. 1 also indicates gravity, acting on the sprung-mass point 122, by a downward-arrowed vector referenced by numeral 130. The vector 130 indicates, by its direction, the direction that the gravity is acting on the vehicle 100—downward, or negatively (–), in the environmental, or earth, frame. It will be appreciated that with the gravity 130 acting vertically downward, it is acting parallel to the environmental vertical 118. The vector 130 also indicates, by its length, the amount of the gravity (e.g., 9.81 m/s$^2$).

FIG. 1 also shows a vector representation of a longitudinal component of vehicle acceleration 132, or $a_x$, which can be considered to act through the sprung-mass point 122, as shown in the figure, and can be perpendicular to the mass-sprung height $h_p$. The longitudinal acceleration 132 ($a_x$) in some embodiments incorporates affects of any vehicle yaw motion.

FIG. 1 also shows, by reference numeral 134, a vector representing a longitudinal acceleration $a_{x,s}$ of the sprung-mass portion of the vehicle 100, or longitudinal mass-sprung acceleration. A longitudinal mass-sprung velocity $v_{x,s}$ can be viewed as a linear portion of the vehicle pitch rate, the vehicle pitch rate being an angular velocity. The longitudinal mass-sprung acceleration $a_{x,s}$, which can be considered extending longitudinally perpendicular to the environmental vertical 118, is thus a linear representation of the change in vehicle pitch rate, the change in vehicle pitch rate being an angular acceleration.

The vectors 130 (gravity, g), 132 (longitudinal acceleration, $a_y$), and 134 (lateral mass-sprung acceleration $a_{y,s}$) indicate graphically, by their respective lengths, amounts of the respective accelerations. The vectors 130, 132, and 134 also indicate graphically, by the respective directions shown in the figure, the directions that the accelerations g, $a_x$, and $a_{x,s}$ are directed.

An angular difference between the vectors 132 (corresponding to acceleration $a_x$) and 134 (corresponding to acceleration $a_{x,s}$) is indicated by an angle 136.

FIG. 1 also shows a line 138 extending from an end of the gravity vector 130 parallel to the line 124 ($h_p$).

From the geometrical relationships, it will be appreciated that each of the angles 136, 140 is equivalent to the angle 128 ($\delta$).

With continued reference to the algorithm of the present technology, in the second operation, the system uses the these relationships, and the estimated pitch rate and the estimated pitch angle determined in the first operation, to estimate the road grade angle ($\alpha$) 112.

In some embodiments, estimating the road grade angle ($\alpha$) 112 is based also on other vehicle dynamics data, such as vehicle yaw rate (r), longitudinal velocity, lateral velocity, and/or longitudinal acceleration.

The vehicle longitudinal velocity and/or acceleration, and if needed vehicle lateral velocity and/or acceleration, can be measured or estimated. The same applies to yaw rate (r).

Regarding lateral velocity $v_x$, if needed, it can be estimated, for example, in accordance with any of the embodiments disclosed in U.S. Pat. No. 8,086,367 (entitled, "Vehicle Lateral Velocity and Surface Friction Estimation Using Force Tables") and U.S. Pat. No. 8,165,769 (entitled, "Multi-Factor Speed Estimation System and Method for Use"), which are incorporated herein by reference.

In one embodiment, the second operation, of estimating the road bank angle ($\alpha$), is performed according to the following relationships:

$$a_{x,s} = a_x \cos(\theta - \alpha) + g \sin(\theta - \alpha) \quad \text{(Equation 4)}$$

wherein:
  $a_{x,s}$ represents the mass-sprung longitudinal acceleration 134, described above; and
  $a_x$ represents the longitudinal acceleration 134, described above;
  $\theta$ (lower-case Roman numeral theta) represents the pitch angle being estimated;
  $\alpha$ (lower-case Roman numeral beta) represents the road pitch angle 112 being estimated;
  g represents gravity, acting straight down as shown; and $$-a_x = \dot{v}_x + O(\beta^2) \quad \text{(Equation 5)}$$

wherein:
  $\dot{v}_x$ (or, first derivative of $v_x$, or, $v_x\hat{\;}$dot) represents a first derivative of longitudinal velocity of the vehicle 100;
  $v_x$ is longitudinal, or forward, x-direction, velocity;
  O represents a high-order function, such as a second-order or higher function; and $$\theta - \alpha = \arcsin \frac{a_{x,s}}{\sqrt{a_x^2 + g^2}} - \arctan \frac{a_x}{g}; \quad \text{(Equation 6)}$$

which yields:

$$\alpha = -\arcsin \frac{a_{x,s}}{\sqrt{\dot{v}_x^2 + g^2}} - \arctan \frac{\dot{v}_x}{g} + \theta. \quad \text{(Equation 7)}$$

Related to the derivative of the longitudinal velocity ($\dot{v}_x$) (or, first derivative of $v_x$, or, $v_x\hat{\;}$dot), it should be appreciated that all vehicle movement can be represented by at least longitudinal, or x-direction, velocity, $v_x$, and lateral, or y-direction velocity, $v_y$. If the vehicle is, by way of example, moving fully forward, the lateral velocity portion $v_y$ would be zero. The first derivative of the longitudinal velocity $\dot{v}_x$ ($v_x\hat{}$dot) is the derivative of the longitudinal velocity $v_x$, or the rate of change of the longitudinal velocity $v_x$.

While the longitudinal acceleration ($a_x$) 132 and the first derivative of longitudinal velocity $\dot{v}_x$ (or, $v_x\hat{}$dot) may in many, and likely most, scenarios be the same or generally the same, the two variables have different definitions and can at times be at least slightly different. In any event, in embodiments using Equation 6 and 7, above, the longitudinal acceleration ($a_y$) 132 cancels out between the two equations, and actually need not be measured or determined in the process.

The effect of the high-order function O is expected to be low, or only negligible, in most or all cases. For this reason, the function O is in some embodiments left out of the algorithm.

IV. Third Operation in the Context of Overall Flow|FIG. 2

The third exemplary operation of the algorithm of the present technology is now described with reference to FIG. 2. As mentioned above, the figure illustrates an exemplary system flow 200 of operations. The flow 200 includes tuning of an observer gain using a tuning, or adaptation function.

The references in FIG. 2 can represent a variety of system flow features, including software modules, inputs thereto, outputs thereof, functions performed by the system, whether by modules or otherwise, and/or other, including as referenced further below.

Data indicating the measured pitch rate described above, in connection with the first operation of the algorithm, is referenced by numeral 202. The pitch rate can be measured by, for instance, a three-axis inertial-measuring device, such as a 3-axis IMU.

The pitch rate measurement has a sign (+/−), or is modified to be signed or supplemented with a sign (+/−), as indicated in FIG. 2 by reference numeral 204.

The signed measurement is an input to pitch observer 206. As mentioned above, the system can include as the observer 206, a Luenberger-type of observer.

As an aside, in control theory, an observer, or state observer, is a module that provides an estimate of a state of a given real plant using measurements of system inputs and outputs. In the present use, the real plant is the dynamic vehicle. Observers are useful in common situations in which all aspects of physical state of the system cannot be, for some reason (e.g., capability or cost), determined by direct measurement. Indirect effects of the internal state are estimated based on the system outputs, or system inputs and outputs.

The resulting representation, or model, of the plant, i.e., vehicle, can be adjusted in an ongoing manner, using successive measured values of input and outputs in iterations of operation, in effort to focus or converge the representation to the actual state of the vehicle being evaluated. For the Luenberger observer, adjustments to an initial model are made, include (i) subtracting an output of the observer from observed output of the vehicle, (ii) then multiplying the result by a factor, such as by a matrix, and (iii) then adding the result to equations for the state of the observer to produce the Luenberger observer.

With continued reference to FIG. 2, another input to the pitch observer 206, in addition to the pitch-rate measurement 202, and for iterations of the flow 200 after a first iteration, is an estimated pitch rate 208 resulting from a last iteration of the flow 200. The return of estimated pitch rate 208 is illustrated by return path 210.

In some embodiments, the process includes a sub-routine of tuning, or adapting, a gain of the observer. The sub-routine or module, indicated in FIG. 2 by reference numeral 212, receives, as input from an estimation sub-routine or module 214 (to be described further below), output of a last iteration of the flow 200, as illustrated by a corresponding illustrated path 216. Resulting output of the tuning sub-routine or module 212 is provided to the observer 206, as shown schematically by a corresponding path 218.

The tuning can include performance of an optimization tool toward achieving optimal gains for all possible scenarios. While other optimization tools can be used, in one embodiment the tool is an iSight optimization software, available from Dassault Systèmes Americas Corp., of Waltham, Mass.

The tuning, or adapting, sub-routine or module 212, and related input/output paths 216, 218, are in some embodiments, performed preferably prior to the vehicle being used by an ultimate customer. They can be performed, for instance, in a manufacturing or pre-manufacturing phase. For example, they can be performed in pre-manufacturing on-road and/or simulation testing of a certain type of vehicle. The algorithm (e.g., code) programmed thereafter into the same-kind vehicles, prior to or in their manufacturing, can include the resulting observer gain(s).

In embodiments in which the gain is pre-tuned for a vehicle, such as described here, the tuning sub-routine or module 212, and related input/output paths 216, 218, can be absent from balance of the flow 200 performed at the vehicle 100 in vehicle operation to estimate vehicle pitch rate and vehicle pitch. The sub-routine 212, and related input/output paths 216, 218, can, e.g., be considered unneeded because the gain has already been optimized for the vehicle. The flow 200 also operates more efficiently without the sub-routine 212, and related input/output paths 216, 218, due, e.g., to savings of processing resources and time that would otherwise be used.

In some embodiments, the vehicle instructions are programmed with the algorithm such that the tuning 212 is performed during customer operation of the vehicle 100.

An output of the tuning can include one or more gains, such as the gains $L_1$, $L_2$, mentioned above. In some embodiments, the instructions are configured to cause the system to organize, in an organizing structure, multiple determined gains, each in connection with a corresponding condition. The gains may be organized, in an organizing structure such as a table, matrix, list, etc., relating each gain to a condition.

For estimating vehicle pitch rate, pitch angle, and road-grade angle, the processor obtains using, or from, the observer, a specific gain, of the multiple gains pre-populated into the organizing structure, corresponding to a present condition of the vehicle. The condition, for instance, may relate to vehicle dynamics, such as pitch rates, longitudinal and/or lateral velocity, longitudinal and/or lateral acceleration, the like, and/or other.

Output of the pitch observer 206 is provided to the estimation sub-routine, or module, 214, which can also be referred to as, e.g., an estimation module, an estimator function, an estimator module, a grade-angle estimator, a slope-angle estimator, just an angle estimator, the like, or similar. As also shown, another input to the angle estimator 214 is longitudinal acceleration 220. The longitudinal acceleration 220 is in some embodiments a measured value.

The angle estimator 214, using the input from the observer 206 and the longitudinal acceleration 220, outputs estimations for the vehicle pitch angle 222, for the road grade angle 224, and for the vehicle pitch rate 208.

As provided, the angle estimator 214 also outputs, along a path 216, data used by the afore-mentioned gain-adaptation function 214. As referenced above, this data includes estimated grade angle as well as pitch angle.

V. FIG. 3

First Example Grade and Pitch Estimation Data

FIG. 3 is a graph 300 showing first example grade and pitch estimation data.

The graph 300 includes a y-axis 302 incremented in angular units—e.g., degrees, and an x-axis 304 incremented in time units—e.g., seconds.

Data for the graph 300 of FIG. 3 was obtained in private testing of the present technology on a first road surface. The road includes generally no grade, or slope.

A first data line 306 shows a line representing data including both a road grade angle estimated according to the present technology and a vehicle pitch angle estimated according to the present technology.

A second data line 308 shows a line representing data including only the road grade angle estimated according to the present technology. I.e., the vehicle pitch angle estimated according to the present technology is not included in the data forming the second line 308.

The data displays the data determinable according to the present technology, including combined pitch and grade estimations, and separate pitch and grade estimations. Prior technologies are not capable of estimating accurately both pitch and grade estimations separately, and also generally simultaneously.

VI. FIG. 4

Second Example Grade and Pitch Estimation Data

Figure 4:
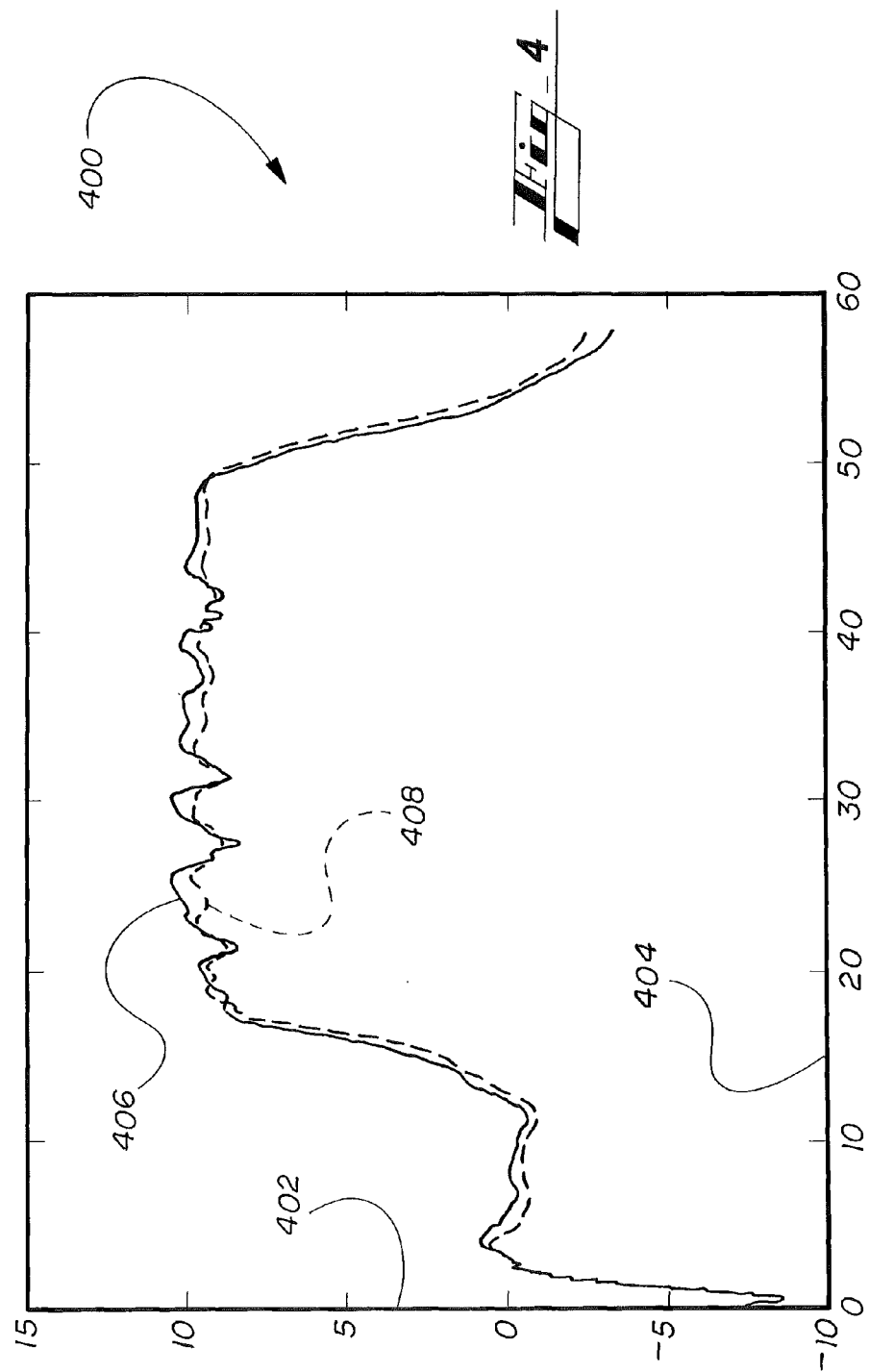
FIG. 4 is a graph showing second example grade and pitch estimation data in connection with vehicle operation on a second road.

FIG. 4 is a graph 400 showing second example grade and pitch estimation data.

The graph 400 includes a y-axis 402 incremented in angular units—e.g., degrees, and an x-axis 404 incremented in time units—e.g., seconds.

Data for the graph 400 of FIG. 4 was obtained in private testing of the present technology on a second road surface. The road includes a generally nine degree (9°) positive slope (incline).

As with FIG. 3, the first data line 406 in FIG. 4 shows a line representing data including both a road grade angle estimated according to the present technology and a vehicle pitch angle estimated according to the present technology.

And, again, the second data line 408 shows a line representing data including only the road grade angle estimated according to the present technology. I.e., the vehicle pitch angle estimated according to the present technology is not included in the data forming the second line 408.

The data, like that of FIG. 3, shows the data determinable according to the present technology, including combined pitch and grade estimations, and separate pitch and grade estimations. Prior technologies are not capable of estimating accurately both pitch and grade estimations separately, and also generally simultaneously.

VII. FIG. 5

First Example Pitch Estimation vs. Measurement Data

Figure 5:
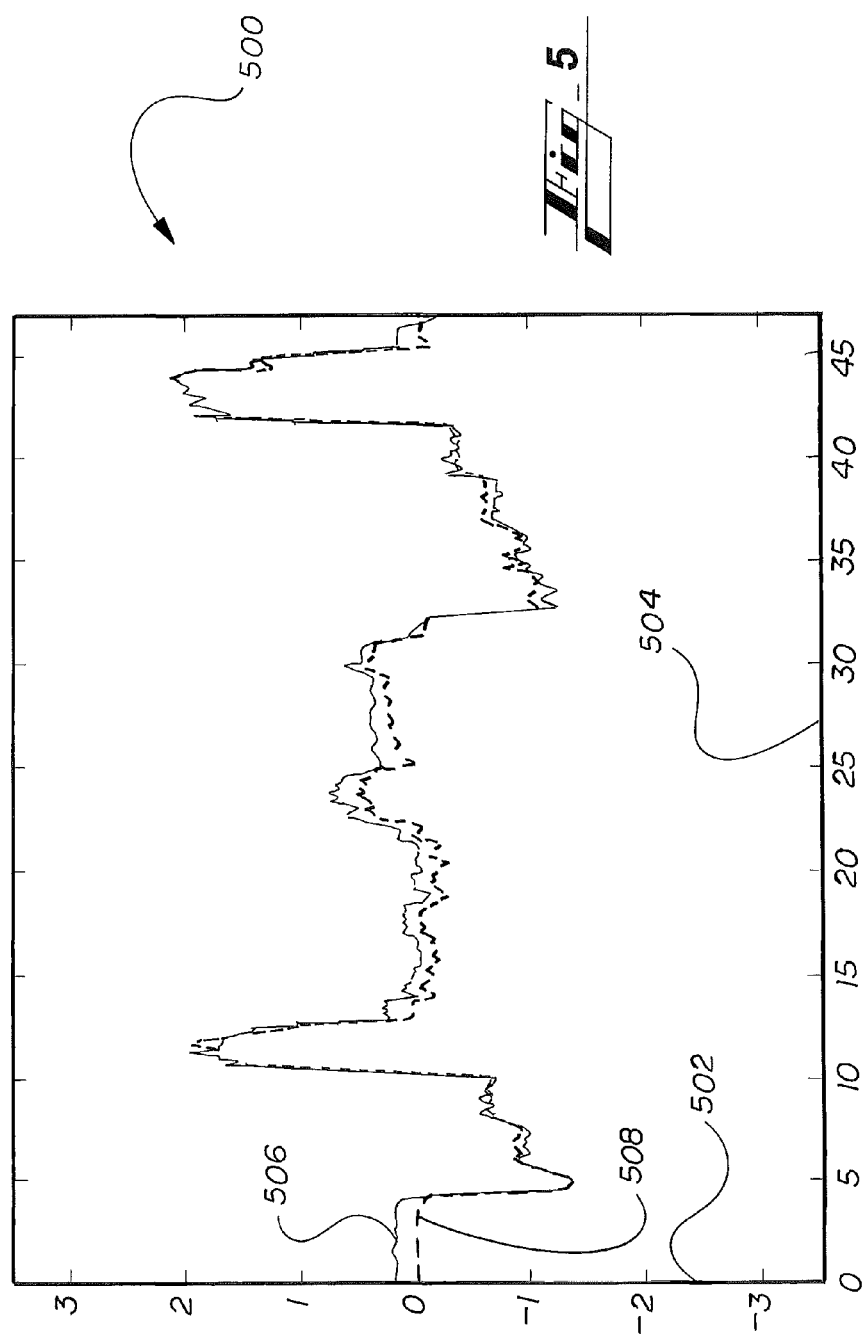
FIG. 5 is a graph showing first example vehicle pitch estimation data as compared to measured pitch data.

FIG. 5 is a graph 500 showing first example vehicle pitch estimation data as compared to measured vehicle pitch data.

As with the other graphs, the graph 500 includes a y-axis 502 incremented in degrees and an x-axis 504 incremented in seconds.

A first data line 506 shows measured vehicle pitch angle, and how it changes with time.

A second data line 508 shows vehicle pitch angle estimated, using an observer as described herein, according to the present technology, and how it changes with time.

Data for the graph 500 of FIG. 5 was obtained in private testing of the present technology on a third road surface.

The data 506, 508 shows that the measured vehicle pitch 506 and the estimated vehicle pitch 508 generally trace each other, varying in step together with similar values. The phenomena confirms the accuracy of both the measured and the estimated values, e.g., accuracy of the observer and its tuned, or adapted, gain.

VIII. FIG. 6

Second Example Pitch Estimation vs. Measurement Data

Figure 6:
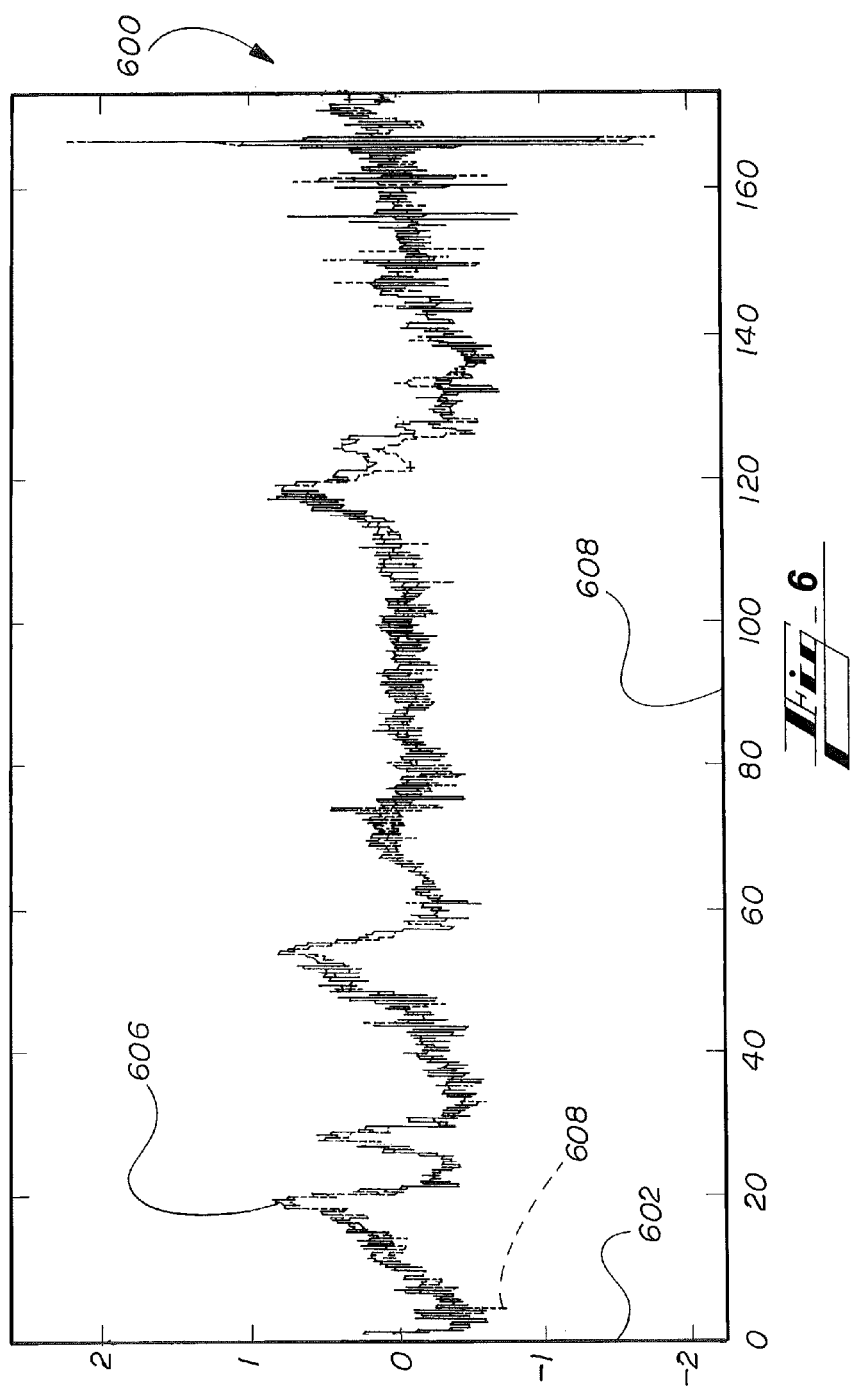
FIG. 6 is a graph showing second example vehicle pitch estimation data as compared to measured pitch data.

FIG. 6 is a graph 600 showing second example vehicle pitch estimation data as compared to measured vehicle pitch data.

As with the other graphs, the graph 600 includes a y-axis 602 incremented in degrees and an x-axis 604 incremented in seconds.

A first data line 606 shows measured vehicle pitch angle, and how it changes with time.

A second data line 608 shows vehicle pitch angle as estimated, using an observer as described herein, according to the present technology, and how it changes with time.

Data for the graph 600 of FIG. 6 was obtained in private testing of the present technology on a fourth road surface.

The data 606, 608 shows that the measured vehicle pitch 606 and the estimated vehicle pitch 608 generally trace each other, varying in step together with similar values. The phenomena again confirm the accuracy of both the measured and the estimated values, e.g., accuracy of the observer and its tuned, or adapted, gain.

IX. FIG. 7

Third Example Pitch Estimation vs. Measured Data

Figure 7:
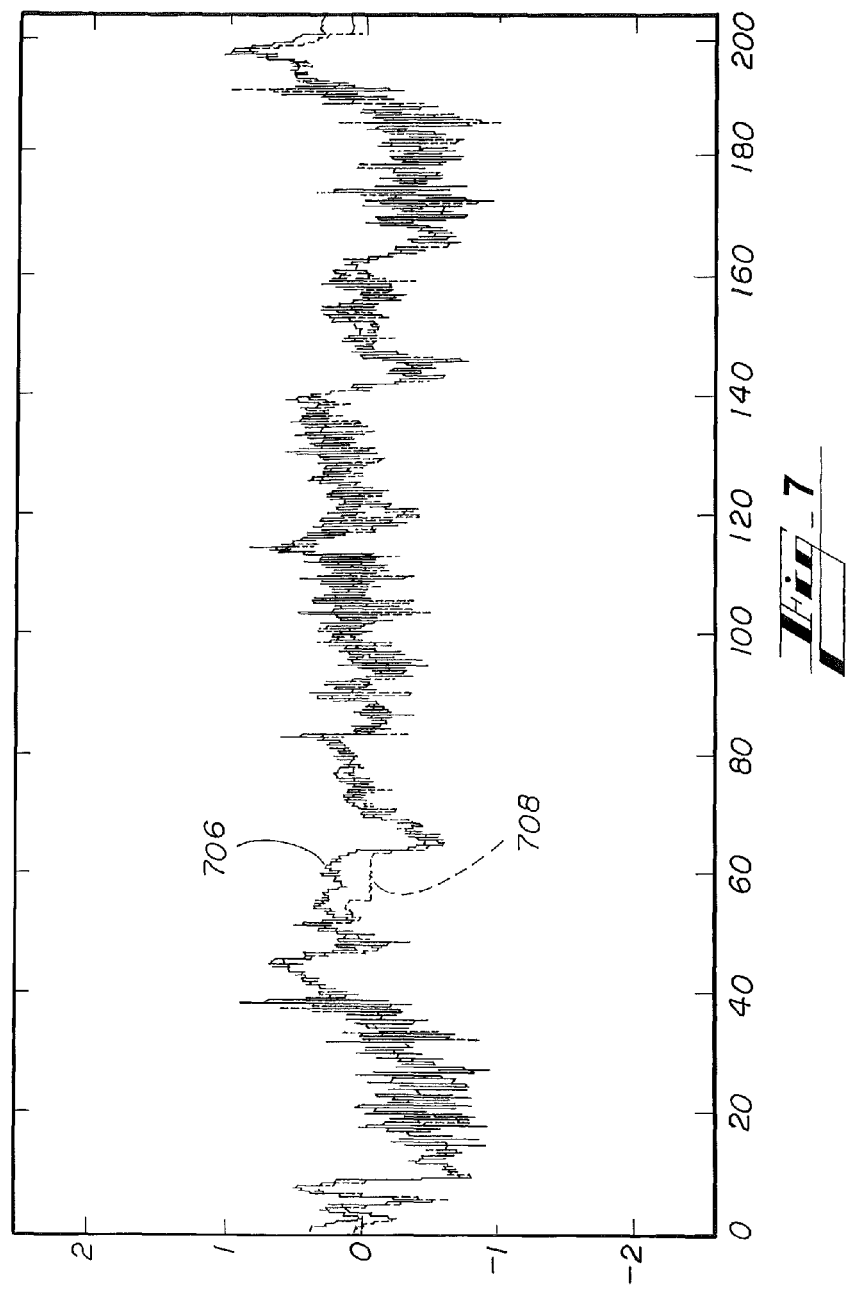
FIG. 7 is a graph showing third example vehicle pitch estimation data as compared to measured pitch data.

FIG. 7 is a graph 700 showing third example vehicle pitch estimation data as compared to measured vehicle pitch data.

As with the other graphs, the graph 700 includes a y-axis 702 incremented in degrees and an x-axis 704 incremented in seconds.

A first data line 706 shows measured vehicle pitch angle, and how it changes with time.

A second data line 708 shows vehicle pitch angle as estimated, using an observer as described herein, according to the present technology, and how it changes with time.

Data for the graph 700 of FIG. 7 was obtained in private testing of the present technology on a fifth road surface. The fifth road includes a 16-degree (16°) grade.

The data 706, 708 shows that the measured vehicle pitch 706 and the estimated vehicle pitch 708 generally trace each other, varying in step together with similar values. The phenomena again confirm the accuracy of both the measured and the estimated values, e.g., accuracy of the observer and its tuned, or adapted, gain.

X. FIG. 8

Example Computing System

FIG. 8 illustrates schematically a vehicle 800, such as the vehicle 100 described above, including an exemplary computing system 802 for use in performing functions of the present technology.

The system 802 includes a memory, or computer-readable medium 804, such as volatile medium, non-volatile medium, removable medium, and non-removable medium.

The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The computing system 802 also includes a computer processor 806 connected or connectable to the computer-readable medium 804 by way of a communication link 808, such as a computer bus.

The computer-readable medium 804 includes computer-executable instructions 810. The computer-executable instructions 810 are executable by the computer processor 806 to cause the processor, and thus the computing system 802, to perform all or any combination of the functions described in the present disclosure, including those described above.

The computer-executable instructions 810 can be arranged in one or more software modules, or engines. The modules can be referred to by the operations or operations that they cause the computer processor 806 to perform. For instance, a module including instructions that, when executed by the processor 806, cause the processor to perform an operation of estimating vehicle pitch angle can be referred to as a pitch-estimation module, a pitch-estimation engine, a pitch estimator, or the like.

Similarly, a module causing the computer processor to perform an operation of tuning observer gains can be referred to as an observer-gain tuner, an observer-gain-tuner module, a gain tuner, a gain-tuning module, a gain-tuning engine, or the like.

The term software module, or variants thereof, is used expansively herein to include routines, program modules, programs, components, data structures, algorithms, and the like. Software modules can be implemented on various system configurations, including servers, network systems, single-processor or multiprocessor systems, minicomputers, mainframe computers, personal computers, hand-held computing devices, mobile devices, microprocessor-based, programmable consumer electronics, combinations thereof, and the like.

The computer processor 806 is also connected or connectable to at least one interface 812 for facilitating communications, between the computing system 802 and local components 814, and between the computing system 802 and remote components 816.

For communicating with the local components 814, the interface 812 can include one or both of wired connections and wireless components—e.g., transceiver, transmitter, and/or receiver.

Example local components include the measurement components described herein, including a three-axis IMU, and any local instrumentation that may be connected at least intermittently at times to the vehicle, e.g., into the interface 812 directly.

For communicating with the remote components 816, the interface 812 includes one or both of a short-range transceiver (or transmitter and/or receiver) and a long-range transceiver (or transmitter and/or receiver).

The remote components 816 can include databases, servers, other processors, other storage mediums, and/or other computing devices.

Although shown as being a part of the computer system 802, completely, the interface 812, or any aspect(s) thereof, can be partially or completely a part of the system 802. The interface 812, or any aspect(s) thereof, can be partially or completely external to and connected or connectable to the computing system 802.

XI. Methods of the Present Technology

Figures illustrating the processes of the present technology are not provided with the present provisional application beyond that provided herewith. Additional flow charts consistent with the teachings herein are considered supported by the present technology and so inherently provided herewith.

The methods include the functions described herein, according to embodiments of the present disclosure. It should be understood that the steps of the methods are not necessarily presented in any particular order and that performance of some or all the steps in an alternative order is possible and is contemplated.

The steps have been presented in the demonstrated order for ease of description and illustration. Steps can be added, omitted and/or performed simultaneously without departing from the scope of the appended claims. It should also be understood that the methods can be ended at any time.

In certain embodiments, some or all steps of this process, and/or substantially equivalent steps are performed by a processor, e.g., computer processor, executing computer-executable instructions stored or included on a computer-readable medium, such as the memory 804 of the system 802 described above.

XII. Conclusion

Various embodiments of the present disclosure are disclosed herein. The disclosed embodiments are merely examples that may be embodied in various and alternative forms, and combinations thereof.

The law does not require and it is economically prohibitive to illustrate and teach every possible embodiment of the present technology. Hence, the above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed:

1. A system, for use at a vehicle to estimate a road grade angle, comprising:
    a sensor configured to measure vehicle pitch rate;
    a processor; and
    a non-transitory computer-readable storage device comprising computer-executable instructions having a virtual observer, wherein the virtual observer includes an observer gain and the instructions, when executed by the processor, cause the processor to perform operations comprising:
        estimating, using the virtual observer and the vehicle pitch rate measured by the sensor, a vehicle pitch rate, yielding an estimated vehicle pitch rate, wherein, due to use of the virtual observer and its gain, any difference between the estimated vehicle pitch rate and an actual vehicle pitch rate is smaller than a difference between the measured vehicle pitch rate and the actual vehicle pitch rate;
        estimating, using the virtual observer and the measured vehicle pitch rate, a vehicle pitch angle, yielding an estimated vehicle pitch angle; and
        estimating, based on the estimated vehicle pitch rate and the estimated vehicle pitch angle, the road grade angle.

2. The system of claim 1, wherein the sensor includes a three-axis inertial-measurement unit.

3. The system of claim 1, wherein:
    the operation of estimating the estimated vehicle pitch rate comprises estimating the estimated vehicle pitch rate using the measured vehicle pitch rate and the virtual observer including a Luenberger observer, and a one-degree-of-freedom model; and
    the operation of estimating the vehicle pitch angle comprises estimating the vehicle pitch angle using the measured vehicle pitch rate received and the virtual observer including the Luenberger observer and the one-degree-of-freedom model.

4. The system of claim 3, wherein the virtual observer and the one-degree-of-freedom model can be represented by relationships including:

$$(J_{yy}+M_s h^2)\ddot{\theta}+C_{\theta\theta}\dot{\theta}+K_{\theta\theta}\theta=M_s h a_x \qquad (\text{eqn. 1});$$

wherein:
    $J_{yy}$ is a pitch moment of inertia of the vehicle;
    $M_s$ is a sprung mass;
    h is a height of the center of gravity of the sprung portion of the vehicle measured from the vehicle roll center;
    $\ddot{\theta}$ (or, second derivative of theta, or theta^dot-dot) represents a pitch acceleration;
    $C_{\theta\theta}$ represents a vehicle damping coefficient;
    $\dot{\theta}$ (or, first derivative of theta, or, θ^dot) represents a pitch velocity;
    $K_{\theta\theta}$ represents a vehicle pitch stiffness coefficient;
    θ represents the pitch angle being estimated;
    $a_x$ represents linear longitudinal acceleration;

$$\dot{\theta}=q+L_1(q_{meas}-q) \qquad (\text{eqn. 2});$$

q is the pitch rate being estimated;
$L_1$ represents a first observer gain;
$q_{meas}$ represents measured pitch rate;

$$\dot{q}=\{-C_{\theta\theta}[q+L_2(q_{meas}-q)]-K_{\theta\theta}\theta+M_s h a_x\}J_{yy}^{-1} \qquad (\text{eqn. 3});$$

$\dot{q}$ (or, first derivative of q, or, q^t) represents the first derivative of the pitch rate being estimated; and
$L_2$ is a second observer gain.

5. The system of claim 4, wherein the operation of estimating the road grade angle (α), comprises:

$$a_{x,s}=a_x \cos(\theta-\alpha)+g \sin(\theta-\alpha) \qquad (\text{eqn. 4});$$

wherein:
    $a_{x,s}$ represents the mass-sprung longitudinal acceleration; and
    $a_x$ represents the longitudinal acceleration;
    θ represents the pitch angle being estimated;
    α represents the road grade angle;
    g represents gravity;

$$-a_x=\dot{v}_x+O(\beta^2) \qquad (\text{eqn. 5});$$

wherein:
    $\dot{v}_x$ ($v_x$^dot) represents a first derivative of longitudinal velocity of the vehicle;
    $v_x$ is longitudinal, or forward, x-direction, velocity;
    O represents a high-order function; and $$\theta-\alpha=\arcsin\frac{a_{x,s}}{\sqrt{a_x^2+g^2}}-\arctan\frac{a_x}{g} \Rightarrow; \qquad (\text{eqn. 6})$$

which yields:

$$\alpha=-\arcsin\frac{a_{x,s}}{\sqrt{\dot{v}_x^2+g^2}}-\arctan\frac{\dot{v}_x}{g}+\theta. \qquad (\text{eqn. 7})$$

6. The system of claim 1, wherein the operations further include tuning or adapting the observer gain of the virtual observer.

7. The system of claim 6, wherein the tuning includes using an optimization tool toward achieving optimal gains for multiple scenarios.

8. The system of claim 6, wherein results of the tuning are incorporated into an organizing structure relating each of multiple observer gains with a distinct vehicle-related condition.

9. The system of claim 8, wherein the organizing structure includes a table.

10. The system of claim 6, wherein:
    the operations are part of a process;
    the tuning is performed in a tuning sub-routine; and
    a first input to the tuning sub-routine is the pitch-rate measurement, and a second input is the estimated pitch rate from a most-recent previous iteration of the process.

11. The system of claim 10, wherein:
    an output of the virtual observer is provided to an estimator sub-routine, which estimates the pitch angle, pitch rate, and grade angle;
    an input to the estimator sub-routine is a longitudinal acceleration; and
    the longitudinal acceleration is a measured value.

12. The system of claim 1, wherein an observer gain of the virtual observer is pre-determined, including by tuning or adapting, before the system is used by a customer.

13. A non-transitory computer-readable storage device comprising computer-executable instructions having a virtual observer, wherein the virtual observer includes an observer gain and the instructions, when executed by a processor, cause the processor to perform operations, for use in estimating a road grade angle, comprising:

estimating, using a virtual observer and the vehicle pitch rate measured by the sensor, a vehicle pitch rate, yielding an estimated vehicle pitch rate, wherein, due to use of the virtual observer and its gain, any difference between the estimated vehicle pitch rate and an actual vehicle pitch rate is smaller than a difference between the measured vehicle pitch rate and the actual vehicle pitch rate;

estimating, using the virtual observer and the measured vehicle pitch rate, a vehicle pitch angle, yielding an estimated vehicle pitch angle; and estimating, based on the estimated vehicle pitch rate and the estimated vehicle pitch angle, the road grade angle.

14. The non-transitory computer-readable storage device of claim 13, wherein the operations further include tuning or adapting the observer gain of the virtual observer.

15. The non-transitory computer-readable storage device of claim 14, wherein:

the operations are part of a process;

the tuning is performed in a tuning sub-routine; and a first input to the tuning sub-routine is the pitch-rate measurement, and a second input is the estimated pitch rate from a most-recent previous iteration of the process.

16. A system, for use at a vehicle to estimate a road grade angle, comprising:

a sensor configured to measure vehicle pitch rate;

a processor; and a non-transitory computer-readable storage device comprising computer-executable instructions that, when executed by the processor, cause the processor to perform operations comprising:

estimating, using a virtual observer and the vehicle pitch rate measured by the sensor, a vehicle pitch rate, yielding an estimated vehicle pitch rate, wherein the virtual observer includes a Luenberger observer and a one-degree-of-freedom model;

estimating, using the virtual observer and the measured vehicle pitch rate, a vehicle pitch angle, yielding an estimated vehicle pitch angle; and estimating, based on the estimated vehicle pitch rate and the estimated vehicle pitch angle, the road grade angle.

17. The system of claim 16, wherein the operations further include tuning or adapting the observer gain of the virtual observer.

18. The system of claim 17, wherein:

the operations are part of a process;

the tuning is performed in a tuning sub-routine; and a first input to the tuning sub-routine is the pitch-rate measurement, and a second input is the estimated pitch rate from a most-recent previous iteration of the process.

19. A non-transitory computer-readable storage device comprising computer-executable instructions that, when executed by a processor, cause the processor to perform operations, for use in estimating a road grade angle, comprising:

estimating, using a virtual observer and the vehicle pitch rate measured by the sensor, a vehicle pitch rate, yielding an estimated vehicle pitch rate, wherein the virtual observer includes a Luenberger observer and a one-degree-of-freedom model;

estimating, using the virtual observer and the measured vehicle pitch rate, a vehicle pitch angle, yielding an estimated vehicle pitch angle; and estimating, based on the estimated vehicle pitch rate and the estimated vehicle pitch angle, the road grade angle.

20. The non-transitory computer-readable storage device of claim 19, wherein the operations further include tuning or adapting the observer gain of the virtual observer.

* * * * *